United States Patent
Routbort et al.

(10) Patent No.: US 7,722,731 B2
(45) Date of Patent: May 25, 2010

(54) JOINING OF ADVANCED MATERIALS BY PLASTIC DEFORMATION

(75) Inventors: Jules L. Routbort, Naperville, IL (US); Dileep Singh, Naperville, IL (US); Kenneth C. Goretta, Tokyo (JP); Felipe Gutierrez-Mora, Seville (ES)

(73) Assignee: UChicago Argonne, LLC, Chicago, IL (US)

( * ) Notice: Subject to any disclaimer, the term of this patent is extended or adjusted under 35 U.S.C. 154(b) by 475 days.

(21) Appl. No.: 11/637,635

(22) Filed: Dec. 12, 2006

(65) Prior Publication Data

US 2007/0187464 A1    Aug. 16, 2007

Related U.S. Application Data

(60) Continuation-in-part of application No. 11/302,419, filed on Dec. 12, 2005, now Pat. No. 7,413,109, which is a division of application No. 09/924,571, filed on Aug. 7, 2001, now Pat. No. 6,974,070.

(60) Provisional application No. 60/749,844, filed on Dec. 12, 2005.

(51) Int. Cl.
    *C03B 29/00*    (2006.01)
    *B29C 65/00*    (2006.01)
    *B31B 1/60*     (2006.01)
    *B32B 37/00*    (2006.01)

(52) U.S. Cl. ..................... 156/89.11; 156/60
(58) Field of Classification Search ............... 156/89.11
    See application file for complete search history.

(56) References Cited

U.S. PATENT DOCUMENTS

| | | | | |
|---|---|---|---|---|
| 4,487,644 A | * | 12/1984 | Gupta et al. | 156/89.26 |
| 4,925,608 A | * | 5/1990 | Rossi et al. | 156/89.28 |
| 2004/0265663 A1 | * | 12/2004 | Badding et al. | 429/30 |

OTHER PUBLICATIONS

Gutierrez-Mora et al., Joining of Yttria-Tetragonal Stabilized Zirconia Polycrystals Using Nanocrystals, Jun. 1, 1999, Scripta Materiallia, vol. 41. No. 5, pp. 455-460.*
Ye et al., Joining of Y-TZP Parts, Mar. 13, 1995, Scripta Metallurgica, vol. 33, No. 3, pp. 441-445.*
Chaim et al., Joining of alumina ceramics using nanocrystalline tape cast interlayer, May 12, 2000, Journal of Materials Research, vol. 15, No. 8, pp. 1724-1728.*
R. Chaim and B.G. Ravi, "Joining of Alumina Ceramics using Nanocrystalline Tape Cast Interlayer," Aug. 2000, J. Mater. Res., vol. 15 No. 8.*

* cited by examiner

*Primary Examiner*—Philip C Tucker
*Assistant Examiner*—Alex Efta
(74) *Attorney, Agent, or Firm*—Cherskov & Flaynik

(57) ABSTRACT

A method for utilizing plastic deformation resulting from grain boundary sliding with or without a novel joint compound that leads to the joining of advanced ceramic materials, intermetallics, and cermets. A joint formed by this approach is as strong as or stronger than the materials joined. The method does not require elaborate surface preparation or application techniques. The method also allows for the formation of transparent joints between two subunits of a construct joined via plastic deformation. The method can be used to tailor residual stresses and maintain native porosity.

16 Claims, 11 Drawing Sheets

Residual Stress to Produce Stronger Constructs

JOINING OF ADVANCED MATERIALS BY PLASTIC DEFORMATION

This utility patent application claims the benefit of U.S. Provisional Application No. 60/749,844, filed on Dec. 12, 2005. This utility patent application is a Continuation-in-Part of U.S. patent application Ser. No. 11/302,419, filed Dec. 12, 2005 now U.S. Pat. No. 7,413,109, which is a Divisional of U.S. patent application Ser. No. 09/924,571, filed Aug. 7, 2001, and issued on Dec. 13, 2005 as U.S. Pat. No. 6,974,070.

CONTRACTUAL ORIGIN OF THE INVENTION

The United States Government has rights in this invention pursuant to Contract No. W-31-109-ENG-38 between the United States Government and The University of Chicago and/or pursuant to Contract No. DE-AC02-06CH11357 between the United States Government and UChicago Argonne, LLC representing Argonne National Laboratory.

BACKGROUND OF THE INVENTION

1. Field of the Invention.

The present invention relates to a method for joining together single-phase or multi-phase objects and similar and dissimilar objects, and more particularly, the present invention relates to methods for joining together ceramic shapes to form pore-free joints or junctions at least as strong as the materials being joined, and to join ceramic/metal composites (cermets) and intermetallics.

2. Background of the Invention

Ceramics in general are difficult to form into complex shapes. At present, complex ceramic shapes are often prepared by forming the complex shape in the green state and then applying heat to consolidate the shape. This heat application will result in shrinkage of the construct and therefore final machining of the construct. This can be difficult and costly.

An alternative method is to form a ceramic blank and then machine the blank into the desired shape. This method also can be difficult, time consuming, expensive, and can introduce flaws in the structure. Flaws introduce stress concentrations which reduce performance of the structure and otherwise render the shape unusable.

Another alternative is to join simpler shapes to form the desired complex shapes. This alternative is similar to brazing or welding of various metal components to form more complex metal components. Ceramic components have been joined using various glasses and metals as the joining material. However, the resulting joints have poor mechanical properties compared to the materials to be joined, and the application temperatures are limited.

Nanocrystalline materials have been used as joint-forming interlayer constituents between the two ceramic shapes to be joined. F. Gutierrez-Mora, A Dominguez-Rodriguez, J. L. Routbort, R. Chaim, and F. Guiberteau, "Joining of yttria-tetragonal stabilized zirconia polycrystals (Y-TZP) using nanocrystals," *Scripta Mater.*, 41, 455-460 (1999), incorporated herein by reference. However, nanocrystalline materials can be very expensive and can be difficult to work with. Nanocrystalline ceramics are difficult to consolidate into a dense body without having the individual grains grow substantially. Growth of the grains eliminates the nanocrystalline nature of the body and renders another common ceramic.

Nanocrystalline materials have other drawbacks. For example, such powders tend to agglomerate badly, hence making it difficult to produce dense bodies or to apply materials uniformly to a surface. Also, nanocrystalline powders are often highly hygroscopic. Adsorption of moisture can make it difficult or impossible to process nanocrystalline ceramic powders into strong, pore-free bodies.

A process called superplastic deformation has been used to join Y-TZP of the same composition as that mentioned in the F. Gutierrez-Mora reference, supra.; J Ye. et al., *Scripta Metall. Mater.*, 33, pp 441-445 (1995), incorporated herein by reference; and A. Dominguez-Rodriguez, et al, *J. Mater. Res.*, 39, p1631-1636 (1998). Superplasticity in deformation of materials occurs by a process known as grain-boundary sliding. At elevated temperature, under application of a stress, individual grains of the solid slide and rotate past each other so that permanent deformation can take place. Generally for superplasticity to occur, individual grains must remain virtually stable. They cannot grow or change shape significantly, nor should they react with other species present. If grain growth occurs, superplasticity is prevented. As grains grow during deformation, small pores are created. These pores grow and eventually join to form cracks which reduce the ceramic strength.

Many previous efforts using nanocrystalline interlayer materials to join objects have resulted in a joint containing porosity. R. Chaim et al., *J. Mater. Res.*, 15, pp 1724-1728 (2000). In these and other similar instances, the interlayer was difficult to prepare and therefore an expensive feature.

Aside from joining ceramic forms, it is also desirous to join shapes comprised of cermets. Cermets are ceramic/metal composites in which ceramic particles are the majority phase by volume. Most cermets contain between 5 and 15 volume percent metal to bind hard ceramic particles such as WC and TiC. Cermets are employed in applications such as cutting tools in which wear resistance is required.

With respect to joining simple cermets to form more complex structures, such as, for example, serrated cutting edges, no joining technology has been found to be widely successful. Conventional welding is ineffective because, at welding temperatures, the ceramic is solid but the metallic phase is liquid. Leaching of the metal and destruction of the cermet occurs during welding.

Conventional brazing or soldering forms joints with insufficient strength for many applications. Also, the resulting joints have poor resistance to heat. Because cutting and grinding operations often produce substantial heating of the cermet tooling, and the stresses on the tooling are high, brazed or soldered joints will fail in most applications.

Complex cermet tooling is typically fabricated to shape. The required procedures make use of intricate and relatively expensive dies or diamond-tooling machining. Furthermore, because of geometric constraints associated with part removal from a die, the shapes that can be formed are limited.

U.S. Pat. No. 6,168,071 awarded to Johns on Jan. 2, 2001 discloses a method for joining materials together by a diffusion process using silver/germanium alloys. No external pressure is applied.

U.S. Pat. No. 5,855,313 awarded to McAfee et al. on Jan. 5, 1999 discloses a method for a two-step brazing process for joining materials with different coefficients of thermal expansion.

U.S. Pat. No. 5,599,419 awarded to Hunter et al. on Feb. 4, 1997 discloses a method for joining polymeric materials via a heated blade which simultaneously heats the two surfaces to be joined. The heated blade is removed and the two surfaces are welded together.

U.S. Pat. No. 4,927,475 awarded to Steinleitner et al. on May 22, 1990 discloses a method for joining surfaces of different materials by applying a glass coating to the two surfaces to be joined. The surfaces are subsequently joined while heated and under external pressure.

U.S. Pat. No. 4,414,166 awarded to Charlson et al. on Nov. 8, 1983 discloses a method for laser joining of thermoplastic and thermosetting materials by laser radiant energy which causes the thermoplastic material to flow onto the thermosetting material. No external pressure is applied.

U.S. Pat. No. 4,247,345 awarded to Kadija et al. on Jan. 27, 1981 discloses a method for joining sections of synthetic materials by placing a thermoplastic sealing composition in a gap between the materials to be joined and then binding the materials together with subsequent heating of the sealing composition. No external pressure is applied.

All of the above produce a joint with inferior strength and properties different from the bulk material being joined.

A need exists in the art for a ceramic joint forming process that results in joints as strong, or actually stronger than the materials joined. The process should be simple in that no elaborate surface preparation or application techniques are required. The process also should utilize common ceramic materials and readily available equipment to minimize costs. Joining temperatures should be as low as possible to minimize degradation of the ceramics being joined and to minimize the cost and complexity of the tooling needed to form the joints. In certain instances, the process should result in a construct which in which the native porosity and optical transmission of the starting materials is maintained, including across the interface region where subunits of the construct are joined.

There is also a need for a technology for producing robust complex cermet forms from simpler ones. The technology should be simple, inexpensive, require few steps to complete, and require minimal surface preparation.

SUMMARY OF THE INVENTION

It is an object of the present invention to provide a method for joining materials that overcomes many of the disadvantages of the prior art.

Another object of the present invention is to provide methods for joining materials wherein the joint formed will actually be stronger than the weakest phase of the multi phase materials it joins. A feature of the invented method is the relative stability of the mixtures utilized. An advantage of the invented method is that the propensity for grain growth is greatly reduced through the use of relatively low temperatures.

Yet another object of the present invention is to provide methods for joining multi phase materials that do not require elaborate surface preparation or application techniques. A feature of the invented method for joining cermets is the use of a joint compound that contains a metal also found in the cermet. An advantage of the invented method is that the equipment needed is relatively inexpensive and readily available.

Another object of the present invention is to provide a method for joining similar or dissimilar multi phase objects. A feature of the invented method is that optimal conditions of temperature and pressure allow for joint formation without an interlayer (i.e. joint compound). An advantage of the invented method is its simplicity of design and operation.

Still another object of the present invention is to provide a method for seamlessly joining ceramic objects to form a construct. A feature of the invented method is that it produces constructs which are extremely robust such as to be crack and crumble-resistant. An advantage of the invented method is that the strength of the joint between the objects is further enhanced due to the lack of porosity which can otherwise weaken the joint.

An object of the present invention is to provide a method for producing a structure which utilizes residual stresses to confer superior mechanical properties. A feature of the invention is utilizing high temperature plastic joining and predetermined positioning of subunits of the structure. An advantage of the invention is that material strength and toughness with the imposition of a single temperature and single pressure value during processing. These improvements in physical toughness occur in situ which is to say while the construct is being formed, and not after the construct is formed. Once the construct is cooled down from the high processing temperatures, the construct undergoes no further physical changes. As such, no post-fabrication "tempering" of the construct is required.

Yet another object of the present invention is to provide a method for joining subunits such that the resulting construct has optical transparency throughout its entire volume.

Still another object of the present invention is to provide a method for producing constructs exhibiting targeted compressive surface stresses. A feature of the invention is controlled particle sizing of the constituents of the subunits, a predetermined stacking order of the subunits, and an application of predetermined temperatures and compressive forces to the construct. An advantage of the invention is the production of reliable joints between the construct having the same porosity, transparency and strength as the subunits, all without the need for a joint compound intermediate the subunits.

In brief, the invention provides a method for the fabrication of constructs containing preselected regions of residual stress, the method comprising selecting constituents of the construct which exhibit grain boundary sliding at temperatures below 0.7 times the melting point temperature of the lowest melting point constituent; assem-bling the constituents to form a loosely assembled construct, and wherein a first subunit with a first coefficient of thermal expansion contacts a second subunit with a second coefficient of thermal expansion; and compressing the loosely assembled construct for a time and at a temperature to cause grain boundary sliding between constituents comprising the first and second subunits to form a rigid construct. The subunits can be similar or dissimilar in constituency, and can be single or multi-phase materials. In an embodiment, the subunits are selected based on their having certain regions of residual stress such that the final construct will exhibit preselected regions of residual stress.

The invention provides a construct comprising a first crystalline solid having a first surface directly bonded to a second surface of a second crystalline solid, wherein the finish of the first surface and second surface are less than or equal to two microns (equivalent to a diamond-saw cut surface), as defined by standard root-mean-square values.

The invention also provides a method for the fabrication of constructs whereby the resulting constructs exhibit tailored regions of residual stress, the method comprising selecting constituents of the construct which exhibit grain boundary sliding at temperatures below 70 percent of the melting point $(0.7T_M)$ of the lowest melting point constituent; assembling the constituents to form a loosely assembled construct, and wherein a first subunit with a first coefficient of thermal expansion contacts a second subunit with a second coefficient of thermal expansion; and compressing the loosely assembled construct for a time and at a temperature to cause grain boundary sliding between constituents comprising the first and second subunits to form a rigid construct.

The invention provides a method for fabricating constructs whose optical transmission is unchanged by joining of the subunits comprising the constructs, the method comprising pressing the subunits against each other to form an interface, whereby plastic deformation occurs under stress at a temperature less than $0.7T_M$ between the units at the interface while maintaining the subunit's native porosity at the interface.

BRIEF DESCRIPTION OF THE DRAWINGS

These and other objects and advantages of the present invention will become readily apparent upon consideration of the following detailed description and attached drawing, wherein.

DETAILED DESCRIPTION OF THE INVENTION

Figure 1:
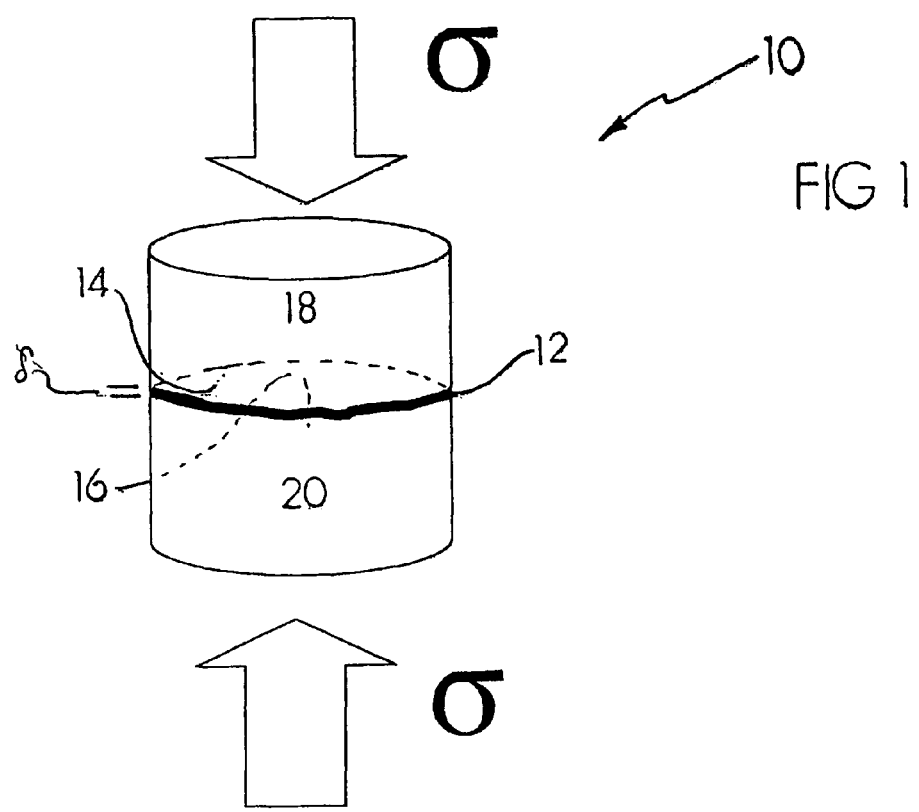
FIG. 1 is a schematic depiction of the invented plastic deformation joining process, in accordance with features of the present invention.

Low-cost, highly optimized methods for joining difficult-to-join materials via plastic deformation are provided. The present invented method enables the joining together of similar or dissimilar materials, which can be single or multi-phase ceramics. A myriad of ceramics are suitable. Exemplary ceramic constructs include those comprised of yttria-stabilized zirconia (YSZ) and $LaSrMnO_3$.

The invented process allows the joining of materials of different compositions, with resulting joints that are seamless (i.e., without added pores, cracks or other discontinuities while also maintaining native porosity of the starting materials). In instances where different materials (ostensibly having different porosities) are seamlessly joined, resulting porosity values at the interface region would be a mixture of the different porosities with the grains from a first more deformable material (i.e., the material which experiences more grain boundary sliding than a second less deformable material) experience more movement into the less deformable material. A suitable protocol for the joining process, as related to hydroxyapatites, is disclosed in D. Singh, et al. *Intl. J. Appl. Ceram. Technol* 2, pp 247-255 (2005) and incorporated herein by reference.

Grain boundary sliding (GBS) is a deformation mechanism that is accompanied by rotation of grains. It is the rotation and interpenetration of grains that results in bonding of similar or dissimilar structures. GBS is determined by grain size, stress placed on the grains, temperature imposed on the system, and the strain rate or duration of the stress applied. These factors, empirically determined, lead to plastic deformation, whereby any construct formed by joining a plurality of objects via grain boundary sliding are pore free, (or alternatively the native porosity of the joined materials are preserved), exhibit tailored microstructures, and can have residual stresses designed into certain regions of the construct. The coefficients of thermal expansion of the constructs to be joined are selected such that the residual stresses resulting from the differences in thermal expansion coefficients resist fracture at stresses equivalent to the stress-failure point of the weakest component of the construct.

The invented joining process allows the resulting constructs to maintain electrical and/or optical properties across any joints formed. The mechanical integrity of the construct is also maintained vis the native integrity of the objects joined. In some cases, particularly at the joint region, the integrity is enhanced.

The joints resulting from the joining method are as strong or stronger than the structures they bond. By selecting the appropriate ratios of phases in the joint, because of differences in thermal expansion coefficients between constituents, the inventors have been able to tailor residual stresses so that the overall strength of the resulting construct is maximized.

The present invention provides a method for joining structures such that the microstructure of the resulting construct, including the interface between the structures, is substantially identical to the starting materials. This microstructure is maintained by utilizing relatively low temperatures (as depicted in Chart 1, infra) for certain time periods.

The present invention covers many types of ceramic joints, including but not limited to ceramic to metal joints and ceramic to intermetallic joints. In the past, hard-to-join materials, such as ceramics or intermetallics, were typically joined with some comparatively low-temperature joint compound. The resulting joints had properties inferior to those of the host material(s). The present invention allows designers and fabricators to produce complex, high-performance parts having defect free joints.

Possible uses for this invention include the manufacture of structural components, batteries, materials with tailored porosity (for use in fuel cells, for example), electro-optical devices, biomaterials (bone replacements, etc.), bioceramics, oxygen sensors, $NO_x$ sensors, intermetallics, electronic ceramics, and optical materials. The invention also enables the combination of ceramics to metals.

The invented joining method enables the following fabrication objectives:
 Joining optical ceramics so that light transmission is unimpeded by the presence of the joint;
 Joining bioceramics, such as hydroxyapatite and its composites, to other ceramics or metals;
 Joining electronic ceramics to other ceramics, in the case in which tailored porosity is required (for fuel cell components and some membranes);
 Joining intermetallics to ceramics; and
 Joining a wide range of ceramics to other ceramics, while establishing compressive surface stresses. Typically, compressive stresses are stated in mega Pascals (MPa)

whereby 1 MPa equals 145 psi. (Alternatively, 1 psi equals $6.9 \times 10^3$ Pascals) Strain rate in compression or tension is merely the rate of change of the strain (i.e., the rate of length change).

The above may be accomplished with or without an interlayer. In one instance, an interlayer 12 (see FIG. 1) comprises an oxide-form of metal contained in at least one of the subunits being joined. As such, an embodiment of the invented method comprises oxidizing metal contained in a subunit to form an oxide film, and positioning that film intermediate the subunits to be joined such that one of the opposing faces of a subunits will be substantially overlaid with the film. The grain size of the oxide layer should be approximately less than 30 microns and the thickness δ of the layer should be greater than the grain side, and preferably at least twice the grain size.

Fabrication Material Detail

A single set of well-controlled experimental variables allows fabrication of the above range of useful joined constructs. Specifically, those variables comprise the following:

1. All materials must be polycrystalline and deform plastically by grain boundary sliding (GBS). Examples of polycrystallinity include those materials comprising many crystals (or grains). Diffraction patterns of such materials yield rings instead of spots. A ceramic can be single crystalline or polycrystalline.

2. Grain sizes preferably should range from 0.3 to 20 microns, with at least one of the constituents being less than 12 microns.

3. Parts must be joined under mechanical compression at strain rates SR of $10^{-7} s^{-1} \leq SR\ 10^{-3} s^{-1}$.

4. Joining times must be between 3 minutes and 500 minutes. These relatively short joining times (compared to several hours or days at the same temperature minutes for conventional joining methods) assures that porosity exhibited in the subunit structures carries over to the final seam/joint.

5. For control of residual stress states, thermal expansion must be considered. (See attached analysis performed through use of composite powders or particulate composites.)

The plastic processes employed for joining (because of their comparatively short times and moderate grain sizes) allow for retention of tailored porosity, including porosity along an interface. This allows for gas phase transport across the joint. The invented method makes reliable porous joints while assuring the correct pore structure and fraction. Chart 1 below lists temperature ranges for forming joints, while minimizing microstructural changes such as grain growth in the parts being joined.

CHART 1

Processing Temperatures based on Melting Temperature ($T_M$)

| Lowest $T_M$ of parts to be joined (° C.) | Processing temperature (° C.) |
|---|---|
| 600-800 | 350-650 |
| 801-1000 | 530-850 |
| 1001-1200 | 650-970 |
| 1201-1400 | 750-1200 |
| 1401-1600 | 900-1300 |
| 1601-1800 | 1100-1520 |
| 1801-2000 | 1400-1750 |
| 2001-2200 | 1500-1950 |

In some instances, no joint-forming compound whatsoever is required. Rather, opposing faces of subunits of the construct to be joined are placed in physical contact with each other. Surface preparation is minimal and requires only that the finish of the opposing surfaces are less than or equal to two microns (equivalent to a diamond saw-cut surface) as defined by standard root-mean square values.

The invention provides for joining shapes by a process that comprises heating the components to an elevated temperature; pressing the shapes together; and doing so with or without use of a joint compound between the shapes to be joined. FIG. 1 depicts the joining process, generally designated as numeral 10.

To form a defect-free joint, pressure is applied to the joint at a level sufficient to effect plastic deformation by grain-boundary sliding. Pressures from 5 MPa to 100 MPa are suitable. Typically, the pressure, designated as σ in FIG. 1, is applied so that the opposing faces 14, 16 of the bulk constituents to be joined are directed toward each other during pressure application. The atmosphere is selected to prevent deleterious reaction with the ceramic bodies. For example, if $Si_3N_4$/SiC composites are to be joined, the atmosphere should be rich in nitrogen and very low in oxygen. If electronic ceramic composites, such as those based on $BaCeO_3$, are to be joined, the atmosphere must have a controlled oxygen partial pressure.

Multi phase compounds are joined by the invented method. This incorporation of multi phase materials eliminates the need of expensive nanocrystalline materials. This is because the joint material itself contains sufficient deformable or plastically deformable material to allow for formation of perfect joints. The multi phase materials also permit the formulation of functionally graded materials that exhibit spatially controlled properties, compositions, and residual-stress states.

In joining dissimilar materials, each component has a unique thermal expansion coefficient that is different from those of the other constituents. With cooling from the joining temperature, residual stresses will develop in the phases of any material. Thus, by selecting the materials, and the concentrations of the compounds, the inventors have succeeded in incorporating select thermal expansions to tailor residual stresses to specific sites of the resulting construct.

For illustrative purposes herein, the multi phase compounds (e.g., two-phase compounds) utilized in the invented protocols are one of two types: (1) ceramics or other materials, in which the crystals of all phases are hard (hardness greater than 1150 on the Knoop scale) and nearly undeformable at room temperature; (2) cermets, in which the crystals of the majority phase are hard and undeformable and the minority, matrix phase is a metal that is deformable at the temperature and stress levels used to form the joint.

Constructs resulting from the joining process can be either homogeneous in constituency (wherein for example, electronic ceramics are joined to electronic ceramics), or heterogeneous in constituency (wherein, for example, electronic ceramics are joined to cermets, or intermetallics, or both). Each of these classes of materials can be joined with or without a joint material between the pieces to be joined. The only requirement is that the objects that are combined into a single piece be composed of stable microstructures (i.e. crystalline grains) that can deform by grain-boundary sliding. In this context, stability refers to lack of significant grain growth of reaction during processing.

In light of the foregoing, while the bulk of this specification details the joining of ceramic and cermet materials, the invented process can be utilized to join a myriad of materials, including but not limited to ceramics, glass-ceramics, hard intermetallics, metals, and combinations thereof.

Residual Stress Detail

Figure 9:
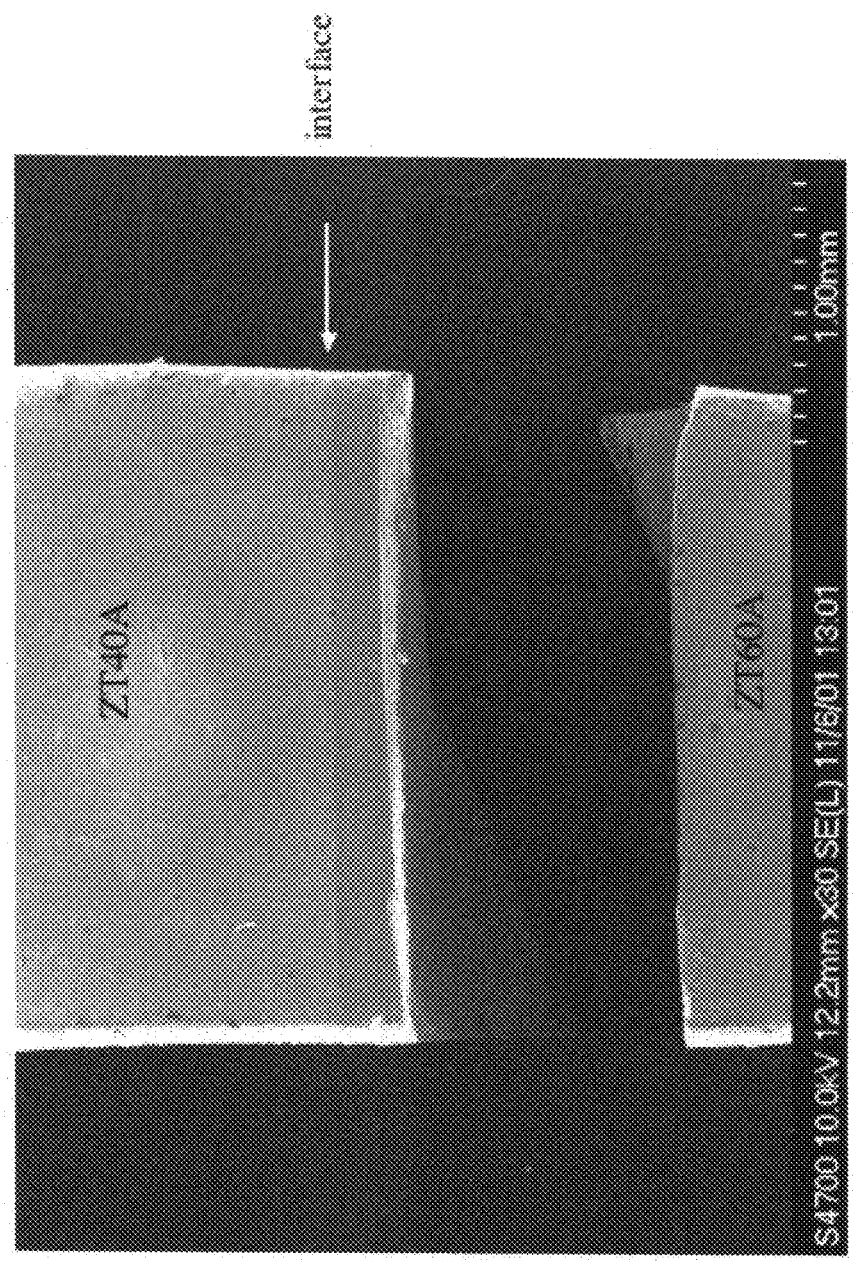
FIG. 9 is a scanning electron micrograph a fracture of a construct, whereby the fracture occurs in a region other than the joint, in accordance with features of the invention.

The inventors have found that they can place tensile and compressive stresses in specific joint regions where they will (a) do the most good by providing residual stresses that increase the joint strength, (b) do the least harm, or (c) do both. For example, selection of the appropriate ratio of phases in the joint allows one to tailor residual stresses so that the overall strength of the resulting construct is maximized. FIG. 9 shows how the invented joining process results in joint strengths that are greater than the strengths of the individual subunits joined, such that any structural failure of the construct occurs at other than the interface (depicted by the arrow). Stresses can be tailored as to location, magnitude and direction in any stable two- or otherwise multiple-phase composite system.

Figure 3:
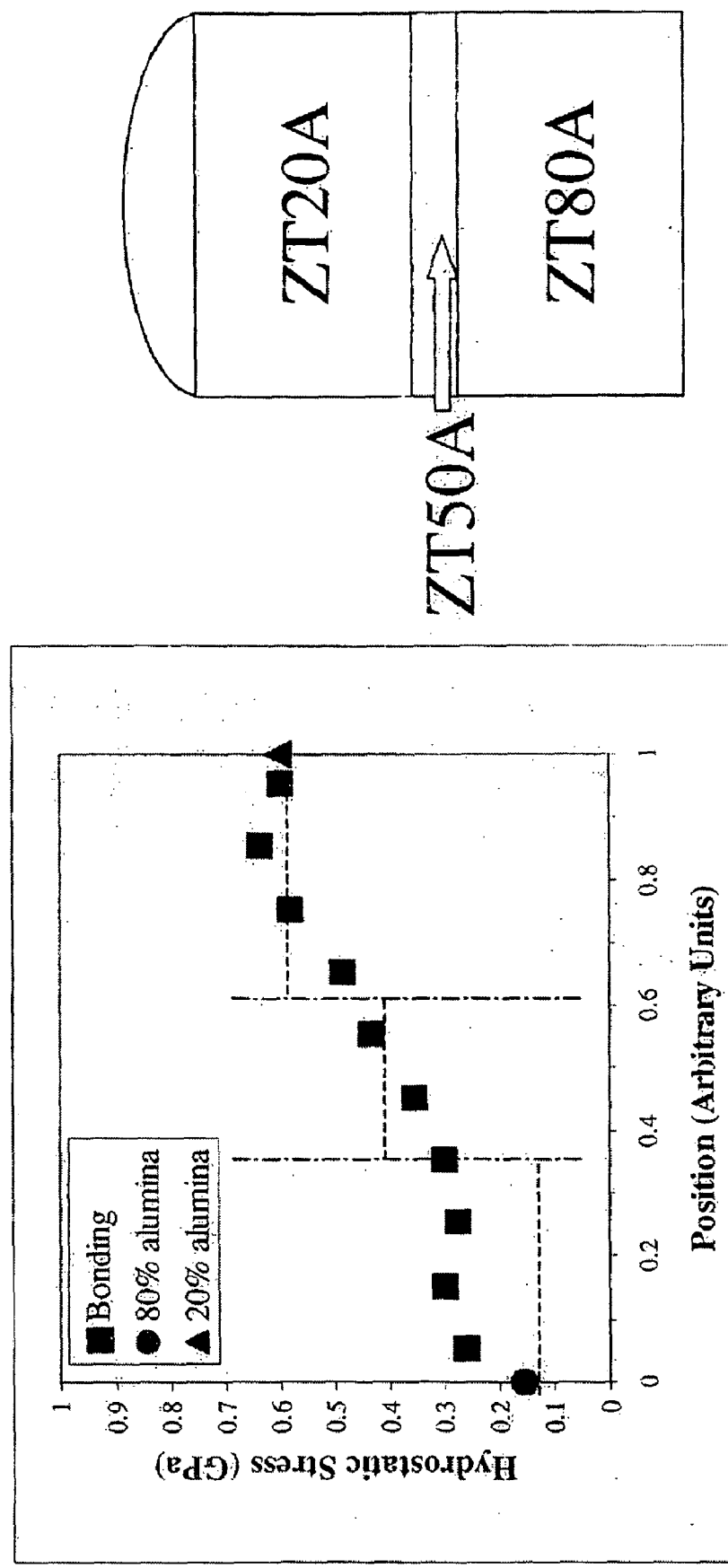
FIG. 3 is a depiction of the residual stresses in a joint formed by joining ZT20A and ZT80A with a joint compound which is ZT50A (50% $Al_2O_3$/50% $ZrO_2$)

As can be noted in FIG. 3, which is discussed in more detail infra, joints which result from the invented process cause a more gradual distribution of stress across subunits of the fabricated construct. Residual stresses can be beneficial, as in the case of compressive stresses acting to minimize crack propagation, or deleterious, as in the case of large tensile stresses promoting crack propagation.

Constituent Ratio and Type for Ceramics Joining Detail

In joining of ceramics and other composite materials in which the individual crystals are brittle and essentially undeformable at low temperatures, the inventors have confirmed that there are specific requirements for the various constituents:

First, phases that come in contact must be kinetically stable with respect to each other. Several ceramic systems exhibit such stability. Examples include, but are not limited to, $Al_2O_3$ and $ZrO_2$; $Al_2O_3$ and yttria stabilized zirconia (YSZ); $Al_2O_3$ and SiC; $Al_2O_3$ and $Y_2O_3$; $Al_2O_3$ and mullite; mullite and $SiO_2$; $ZrSiO_4$ and $SiO_2$; $Al_2O_3$ and $Y_3Al_5O_{13}$; $Si_3N_4$, SiC, MgO and $Al_2O_3$. In addition, more than two phases can be present. For example, the three-phase system of $Al_2O_3$, YSZ, and $MgAd_2O_4$ is kinetically stable. During the bonding process, no gross reaction can occur between any of the phases.

Second, at least one of the constituents of the structure (wherein the structure comprises the bulk material and optionally, a joint compound material) should consist a phase that exhibits flow by grain boundary sliding at the temperature at which the joint is formed.

The inventors have determined that most preferable ceramics and other hard materials that deform by grain boundary sliding of microstructures of equiaxed grains (i.e., the grain aspect ratio is approximately 1.) These materials will deform if the temperature is kept sufficiently low to prevent significant grain growth (inasmuch as deformation rate is a very strong function of temperature). Alternatively, the microstructure must be such that its propensity for grain growth is inherently small. The invention makes use of this type of inherently stable microstructure.

The invention does not require, in contrast to previous technologies, that any of the individual components of a compound (i.e., either the joined pieces or the joint compound) be entirely deformable (such as plastically deformable) at the temperatures and pressures used for joining. It requires only that approximately 65% or more of any one of the components consist of a deformable material. Deformable means that the material can achieve dimension changes at a range of temperatures and stresses without fracture. In one embodiment, materials are fabricated whereby up to 10 percent strain occurs at a temperature and stress without fracture.) The other 35% (or less) may consist of any chemically compatible species. This option allows for incorporation of, for example, toughening agents or for functional materials of various forms (for example, addition of an electronically conducting material such as TiC to the insulator $Al_2O_3$). Exemplary toughening agent species include, but are not limited to platelet powders, whiskers, nanowires (having diameters of less than 100 nanometers) and chopped fibers, said entitles comprised of $Al_2O_3$, mullite, $Si_3N_4$, SiC, TiC, and $Y_3Al_5O_{13}$; $SiC/Si_3N_4$, $Al_2O_3$/mullite, or combinations thereof. Unreactive metals also can be utilized, including, but not limited to, W, Pt, Pd, Au-Pd alloys, Ag-Pd alloys, Ni, or Co.

For ceramics, the various phases must be kinetically stable with respect to each other. That is, at the temperature at which the joint is formed, the individual phases must remain distinct and intact. No significant reaction can occur during the joining. The phases may be thermodynamically stable with respect to each other; that is, no reaction occurs at the temperature of joining, irrespective of time. Alternatively, the phases may be reactive, but the reaction must be sufficiently slow so that no significant reactions occur during joining. In the invention, maximum times at the highest temperature are less than three (<3) hours. In this case, the phases must remain distinct and intact for at least three (3) hours.

Temperature Detail

The invented protocols utilize low temperatures, i.e., temperatures between 600° C. and 1450° C. for ceramics and other hard materials and between 400° C. and 1100° C. for cermets. Generally, temperatures T are less than or equal to approximately $0.7T_m$, wherein $T_m$ is the melt temperature of the lowest melting component in the resulting construct. Preferably, the temperature is selected from between 0.5 and $0.7T_m$. The low temperature protocol minimizes grain growth within any joints formed, and reduces the cost of heating.

Detail of Ceramic Construction Sans Joint Compound

The salient features of the joining process are the inverse relation between stress and temperature (lower stresses can be used to form the joint if the temperature is increased) and the direct relation between temperature and grain size (smaller grain sizes allow for use of lower temperatures). Selection of particulate composites, in which no one phase is more than 85 vol. % of the total, allows for formation of pore-free joints. The grains of the pieces to be joined must be less than or equal to 10 microns in average size. More preferably, they must be less than 3 microns.

The surface finish, as defined by a standard root-mean-square figure of merit, must be approximately no greater than 2 microns, and preferably no greater than 1 micron. In addition, the initial pieces must be pore-free in order for pore-free joints to be fabricated.

Figure 4:
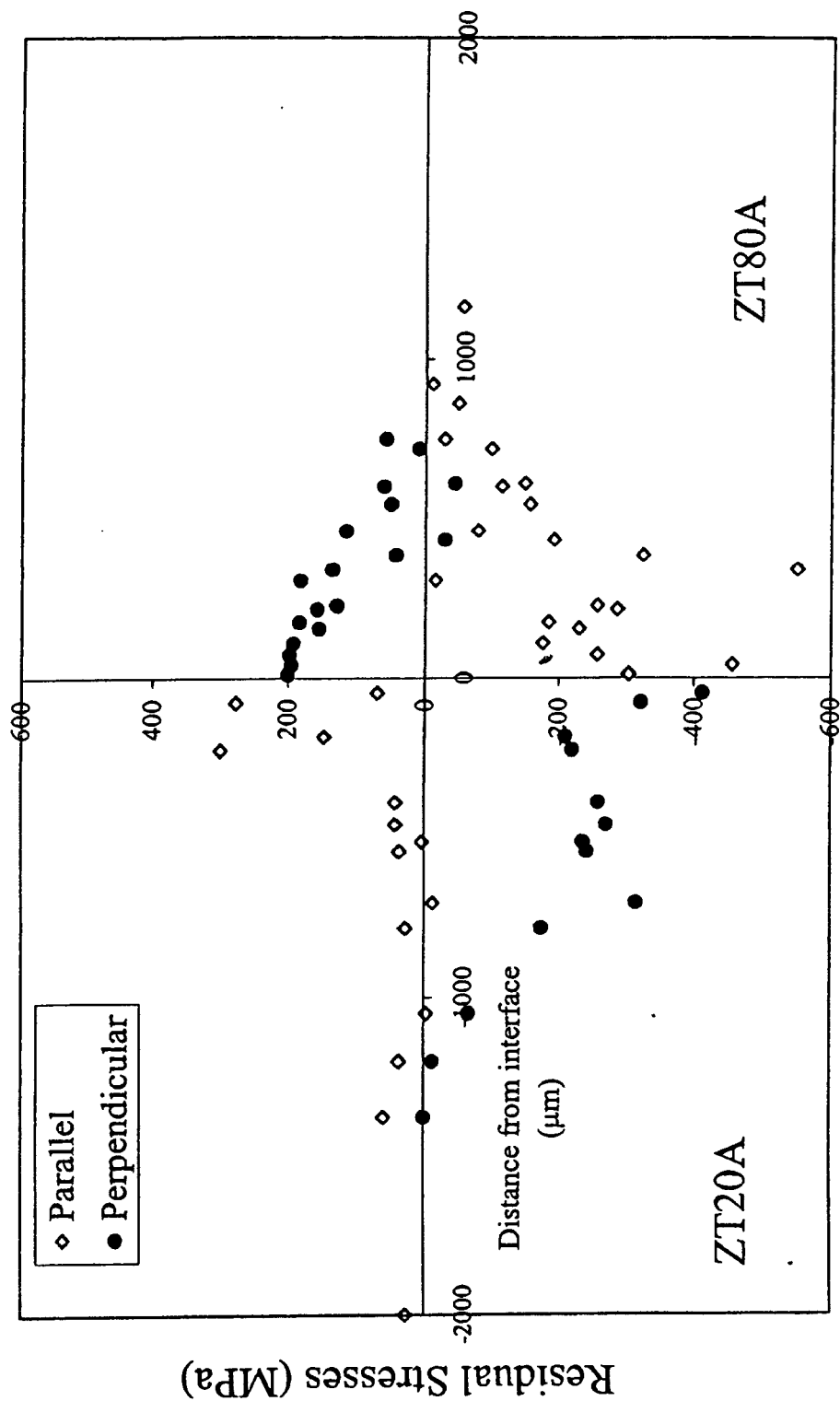
FIG. 4 is a graph depicting residual stresses measured by indentation techniques, in accordance with features of the present invention.

FIG. 4 details residual stresses measured by indentation techniques. The open symbols represents stresses parallel to the interface while closed symbols represent stresses perpendicular to the interface.

Detail of Cermet Joining

Joint production in cermet shape processing has some peculiarities. As with ceramic shape production, the phases in the cermets also must be kinetically stable. Thin and strong metallic joints in cermets can be created by plastic deformation. Although the temperature and stress ranges used to form the cermet joints are similar to those used for the ceramic joints, the cermet joints differ significantly from those in ceramics and other hard materials.

In contrast to the invented protocol utilized for ceramic shape processing, the constituents of joint compounds used in joining cermets are dissimilar to the constituents of the cermets being joined. First, unlike the joining of ceramics, joint compound is usually required in cermet joining.

Second, the resulting joint can be multi phase or single phase (in ceramics, the joint should be multi phase). Third, an additional processing step is required in which the joint compound is reduced or dried to a metal. Fourth, the resulting joints are stronger than the cermets being joined, but the strength arises from a difference in physical properties (in this case, inherent ductility because of activation of dislocation motion), not from a difference in grain size.

The inventors fabricated joints in low-metal-fraction cermets. A joint compound is required. In one protocol, flat surfaces having a finish, as defined by a standard root-mean-square analysis, of 1 micron or less are joined. Finishes of up to 2 microns are suitable. The surfaces are cleaned by standard techniques, such as washing with a solvent such as acetone or methyl alcohol. In one scenario, the surfaces to be joined are coated with a solution of metal nitrates or acetates. The solution may also contain dispersed, fine particles of carbides or nitrides, such as WC, TiC, or TiN. These hard particles are generally the same as those that are present in the host cermets. The hard carbide and/or nitride particles must be smaller than 2 microns for a pore-free joint to be formed. In addition, the volume fraction of hard particle in the final joints can be no greater than 0.5. The solution is applied by sequential dip-coating, spraying, or painting. The solvent can be water, various alcohols, or other suitable solvents. While any metal is acceptable, the metal in solution is preferred to be similar to the metal in the cermet (for example, transition metals). Suitable metals include Ti, Mn, Fe, Co, Ni, and Zr. Co is the most common.

Once the metal solution is added to the surface, the solution is then decomposed. One method of decomposition includes heating the solution-coated surfaces in a reducing atmosphere at moderate temperatures. For example, the solution coated surfaces can be placed in a hydrogen-gas laden atmosphere, at temperatures between 150 and 800° C. for a time sufficient for the solution to be converted to metal.

After the solution decomposes from the surface, the surfaces are joined at 1000° C. and under stresses of between 3 and 300 MPa. Preferable pressure is between 100 psi and 15,000 psi. The atmosphere should be reducing so that no oxide forms in the joint. The resulting joints are one of two types: (1) Pieces joined directly by a metal such as Co, in which case the joint thickness should be approximately less than 5 microns, (2) Pieces joined with a composite of metal such as Co and up to 50% of the volume consists of hard particles such as WC, in which case the joint can be up to 10 microns thick.

EXAMPLE 1

Dense $Al_2O_3$/YSZ pellets, denoted ZTA, are joined without an intermediate layer. The invented protocol allows for one of the pellets to be from 15 to 85% $Al_2O_3$, with the balance being YSZ, and the other pellet being from 0 to 100% $Al_2O_3$, with the balance being YSZ. The pellets are prepared by blending starting powders well in the case of particulate ZTA composites or simply weighing out powders in the case of monolithic ceramics. The powders are then cold-pressed into compadts, which are sintered in air, oxygen, or inert atmosphere at temperatures of 1400-1600° C.

Thermal-expansion coefficients of the ceramics and composites were measured in a Theta Industries Dilatronic (Port Washington, N.Y.).

Figure 2:
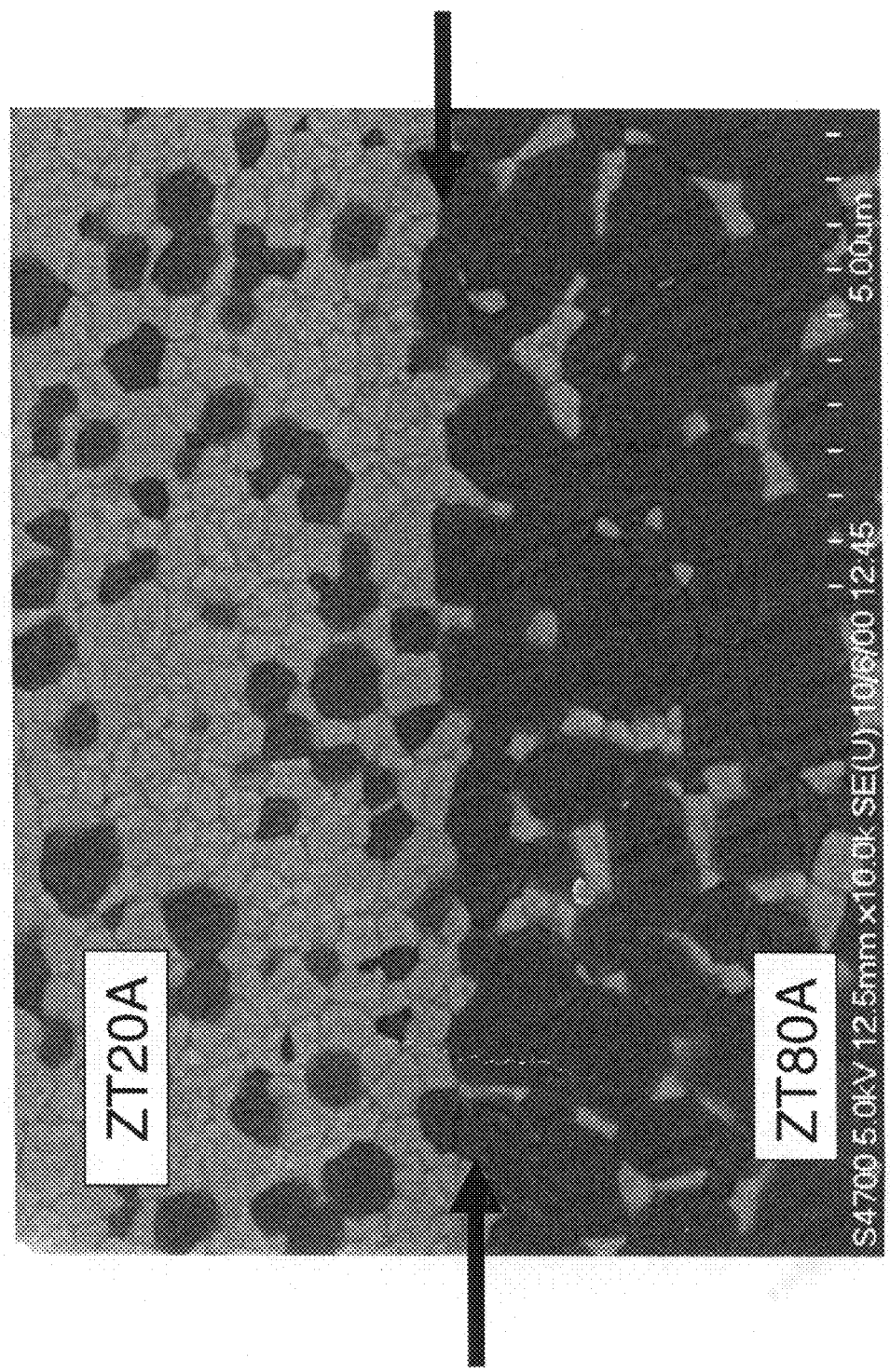
FIG. 2 is a Scanning Electron Microscope (SEM) photomicrograph of a joint between ZT80A (80% $Al_2O_3$/20% $ZrO_2$) and ZT20A (20% $Al_2O_3$/80% $ZrO_2$), in accordance with features of the present invention.

Once the two surfaces are mated, the construct is placed under compression utilizing a commercially available ram, such as an Instron universal testing apparatus (Canton, Mass.). The construct and compression rams are then heated to a temperature that is approximately 0.6 that of the melting point of $Al_2O_3$. In the case of the specific joint in this example, in which 80 vol. % $Al_2O_3$/20 vol. % YSZ is joined to 20 vol. % $Al_2O_3$/80 vol. % YSZ, the temperature is 1350° C. Initial strain rates for the application of pressure were $10^{-5}$ per second and the total strain is less than 10%. (The strain figure refers to total compressive deformation relative to the initial height of the entire construct.) Application of a maximum pressure of 10 MPa for less than 1 hour is sufficient to induce enough plastic deformation by grain-boundary sliding to form a pore-free joint (FIG. 2).

Joined specimens were sectioned, polished, and examined by scanning electron microscopy (SEM) via a commercially available electron microscope, such as the Hitachi S-4700-II (Tokyo, Japan). Vickers microhardness measurements on polished specimens were made with hardness testers, such as the Model MV-1 hardness tester (Matsuzawa, Ishikawa, Japan).

Any attempt to fabricate the same joint using more typical diffusional bonding requires temperatures exceeding 1550 C. Also, elaborate (and therefore expensive) surface preparation is necessary. In the end, and despite these more elaborate procedures, an imperfect joint results from conventional joining techniques.

EXAMPLE 2

If an intermediate joint compound is used, the dense bodies to be joined can be, but are not limited to, ZTA composites, or pure $Al_2O_3$, or pure $ZrO_2$. They are prepared in the same manner as described in Example 1. Once they have been sintered, they are coated with the joint material.

In this example, a dense 60 vol. % $Al_2O_3$/40 vol. % YSZ body is joined to a dense 40 vol. % $Al_2O_3$/60 vol. % YSZ body. The intermediate layer is 50 vol. % $Al_2O_3$/50 vol. % YSZ (50ZTA), which is applied by aerosol spraying. No surface preparation is required of the bodies to be joined. The joint material is prepared by blending 2 g of 50ZTA, 5 g of solvent, 1.2 g a suitable binder, such as of Rohm & Haas AT-51 binder, 0.15 g of a plasticizer such as 0.15 g of Monsanto S-160 plasticizer, and 0.06 g dispersant, such as Avecia S-9000 dispersant. These constituents are placed in a milling container, in this case a 25 mL polyethylene jar, along with YSZ grinding media. The jar was then sealed and placed on a ball-mill rack. The mixture is milled for approximately 16 hours.

After milling, the mixture is placed into an aerosol-spray nozzle and applied to the surface of each ZTA body. An inert gas such as nitrogen gas is used as the propellant. 20 individual passes are used to apply the joint material. The coated bodies are then heated in air to 600° C. to remove organics and other volatile materials. The surfaces to be joined are mated, and then the resulting construct is placed into an Instron universal testing apparatus (Canton, Mass.). The construct and Instron compression rams are then heated to a temperature that is approximately 0.6 that of the melting point of $Al_2O_3$. In the case of the specific joint in this example, the temperature is 1350° C. Initial strain rates for the application of pressure are $10^{-5}$ per second and the total strain during joining is less than 5%. Application of a maximum pressure of 1500 psi for less than 0.5 hour is sufficient to induce enough plastic deformation by grain-boundary sliding to form a pore-free joint.

Another embodiment of the invented joining process is the modification of surface stresses of the construct to produce stronger constructs. FIG. 5 is a schematic diagram of a layered composite constructed with the incorporation of residual stresses to enhance mechanical properties such as tensile strength, hardness, bonding strength, fracture toughness and stress corrosion cracking.

Stress Calculation and Tailoring Detail

The method incorporates the use of the following algorithms in engineering stress and mechanical characteristics into fabricated substrates.

For a perfectly bonded interface, the average residual stresses generated in the layers A and B can be given as (Virkar et al., J. Am. Ceram. Soc., 70 [3] 164-70 (1987)), and incorporated herein by reference:

$$\sigma_B = \frac{-E_A E_B d_A \Delta \varepsilon_o}{(1-v)(2 E_B d_B + E_A d_A)} \quad (1)$$

$$\sigma_A = \frac{2 E_A E_B d_B \Delta \varepsilon_o}{(1-v)(2 E_B d_B + E_A d_A)} \quad (2)$$

$E_A$, $E_B$ are elastic constants for materials A and B, respectively, v is the Poisson's ratio, and $\Delta e_o$ is the difference in the strain in the two layers and can be given in terms of the Coefficient of Thermal Expansion (CTE) of the two materials and the cool down temperature range ($\Delta T$) over which the stresses are generated:

$$\Delta \varepsilon_o = \Delta \alpha \Delta T = (\alpha_A - \alpha_B) \Delta T \quad (3)$$

whereby $\alpha_A$ is the CTE of A and $\alpha_B$ is the CTE of B.

It should be noted that from simple force balance, $$\sigma_A(d_A) + \sigma_B(2d_B) = 0 \quad (4)$$

From Eqn. 1, assuming $E_A = E_B$, surface compressive stress in outer layer B can be given as:

$$\sigma_c = -\frac{d_A E \Delta \varepsilon_o}{(1-v)(2d_B + d_A)} \quad (5)$$

where, $(2d_B + d_A)$ is the total thickness of the layered composite.

Failure in these composites will be initiated at the two highly likely locations (Virkar et al., ibid): (a) in material A at the A/B interface; (b) surface failure in material B. Using these two failure location scenarios, the effect of the residual stresses on the mechanical properties of the layered composites is computed.

Condition 1: Failure Initiation at the Interface

Using outer fiber bending stress, fracture stress of the layered composite will be given as:

$$\sigma_f = (\sigma_{f_A}^o - \sigma_t)\left(\frac{2d_B + d_A}{d_A}\right) \quad (6)$$

where, $\sigma_{f_A}^o$ is the fracture stress for monolithic material A, and $\sigma_t$ is the tensile stress in material A given as:

$$\sigma_t = \frac{2d_B \Delta \varepsilon_o E}{(2d_B + d_A)(1-v)} \quad (7)$$

or $$\sigma_t = \frac{2d_B(\alpha_B - \alpha_A)\Delta TE}{(2d_B + d_A)(1-v)} \quad (8)$$

upon rearranging, $$\sigma_f = \sigma_{f_A}^o\left(\frac{2d_B + d_A}{d_A}\right) - \frac{2d_B(\alpha_B - \alpha_A)\Delta TE}{d_A(1-v)} \quad (9)$$

Condition II: Failure initiation at the outer surface

Failure stress can be given simply as:

$$\sigma_f = \sigma_{f_B}^o - \sigma_c \quad (10)$$

where, $\sigma_{f_B}^o$ is the fracture stress for monolithic material B, and $\sigma_c$ is the compressive stress in material B given by Eq. 5. Upon substitution, $$\sigma_f = \sigma_{f_B}^o + \frac{d_A E(\alpha_B - \alpha_A)\Delta T}{(1-v)(2d_B + d_A)} \quad (11)$$

Layers of material A and B are chosen with predetermined coefficient of thermal expansions and suitable high temperature deformation characteristics. To generate compressive residual stresses in the outer layers B, the coefficient of thermal expansion (CTE) of material A is greater than that of material B. By manipulating the relative thicknesses dA and dB and the CTE of materials A and B, residual stresses are tailored to modify the fracture behavior of the layered composite or construct. For example, increasing dB for interfacial failure increases the fracture stress of the joint construct. In this particular schematic, ZT40A and ZT60A comprise the constituents of the materials A and B respectively, whereby ZT indicates zirconia toughened alumina and the numerals (i.e., 40 and 60) represent the weight percent of alumina in the material.

Figure 5B:
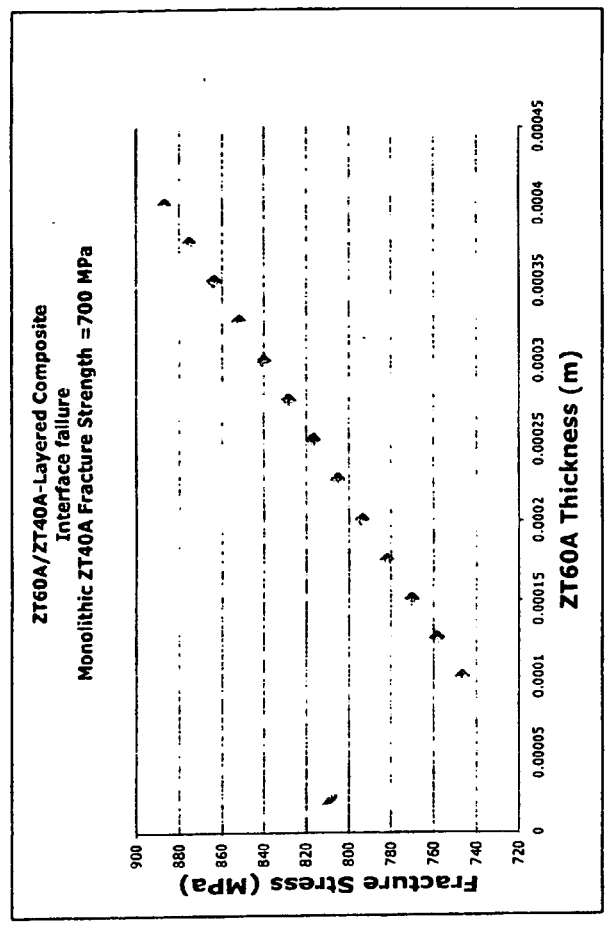
FIGS. 5A-D is a schematic of layered composites formed by the invented fabrication method, and graphs showing strength and stress characteristics of the resulting monolith, in accordance with features of the present invention.
Figure 5A:
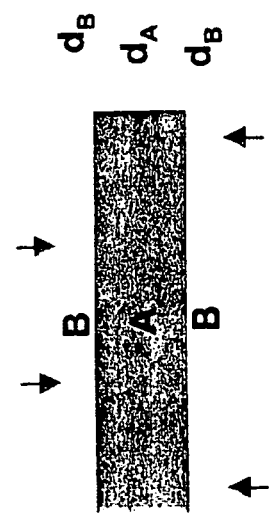

FIG. 5B is a graph showing how fracture stress for the constructed depicted in FIG. 5A increases with thickness of the outer material "B." For an outerlayer thickness of 0.4 mm, the predicted strength of the interlayer (from Equation 9) is approximately 890 MPa. This is an increase of more than 27 percent from the monolithic strength of 700 MPa for ZT40A.

Figure 5C:
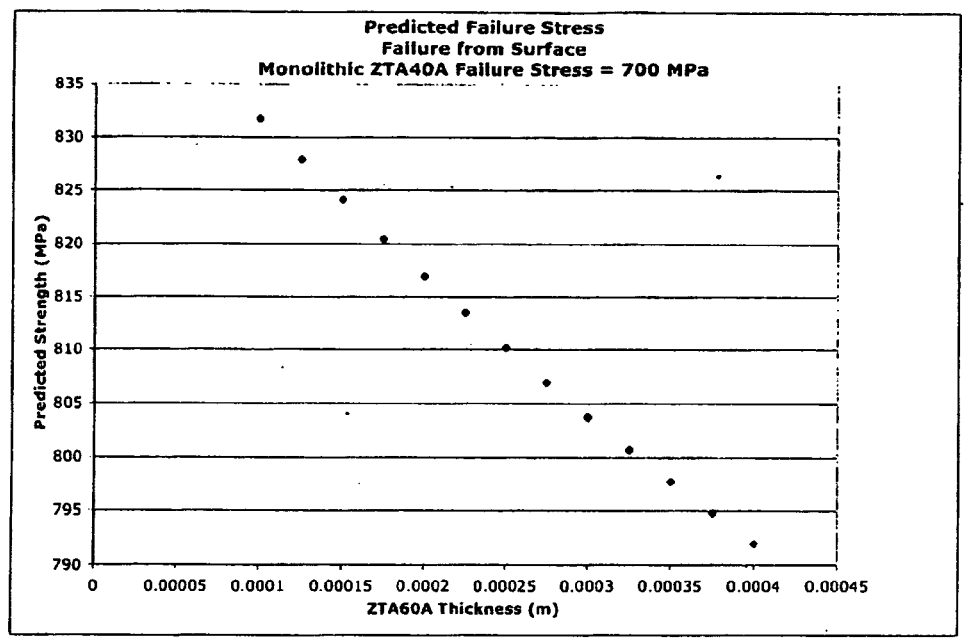

FIG. 5C is a graph showing the relationship between surface strength values increasing thickness of the surface layer of composite structures (i.e., structures comprised of two or more bulk subunits. While a decrease in strength is shown, the composite still exhibited strength increases of more than 20 percent (or more than 830 MPa) compared to monolith strength values. These strength increases were deduced using Equation 11.

Figure 5D:
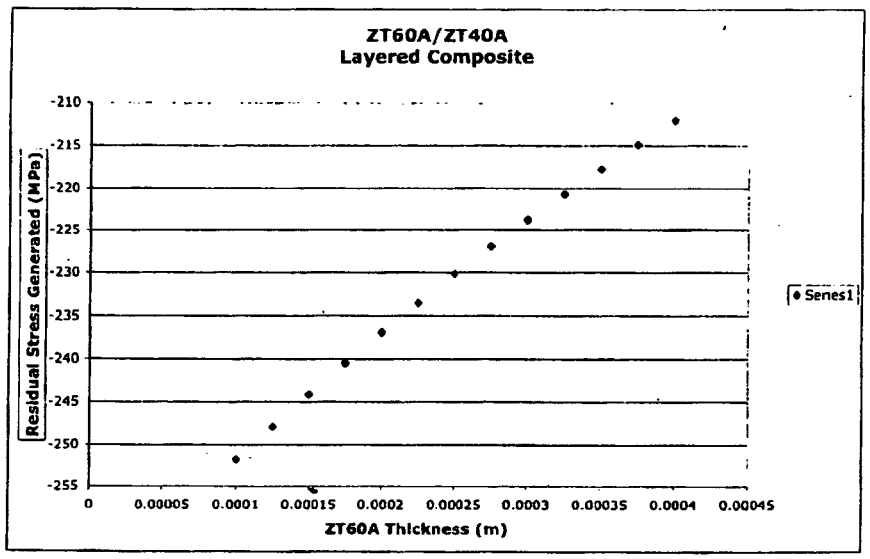

FIG. 5D is a graph depicting the residual stresses generated with varying outer layer (i.e., material "B") thicknesses. These stress values for the surface layers were calculated using Equation 5. With the thickness of material "A" kept constant, and the thickness of material "B" varying from 0.1 mm to 0.4 mm, residual compressive stresses increase with decreasing outer layerthickness. Moreover, typical magnitudes of the residual compressive stress ranged from −210 to −250 MPa. (By convention, compressive strength values are depicted as negative, tensile strength values as positive.)

Surprisingly and unexpectedly, constructs fabricated via the aforementioned process exhibit only a 10 percent difference (generally a decrease or shrinkage), and usually less in geometric shape when subjected to mechanical stress. This ≦10 percent dimensional control, and the control of residual stress states is the result of consideration and selection of those constituents having thermal expansion coefficients to achieve the desired effect.

Figure 6:
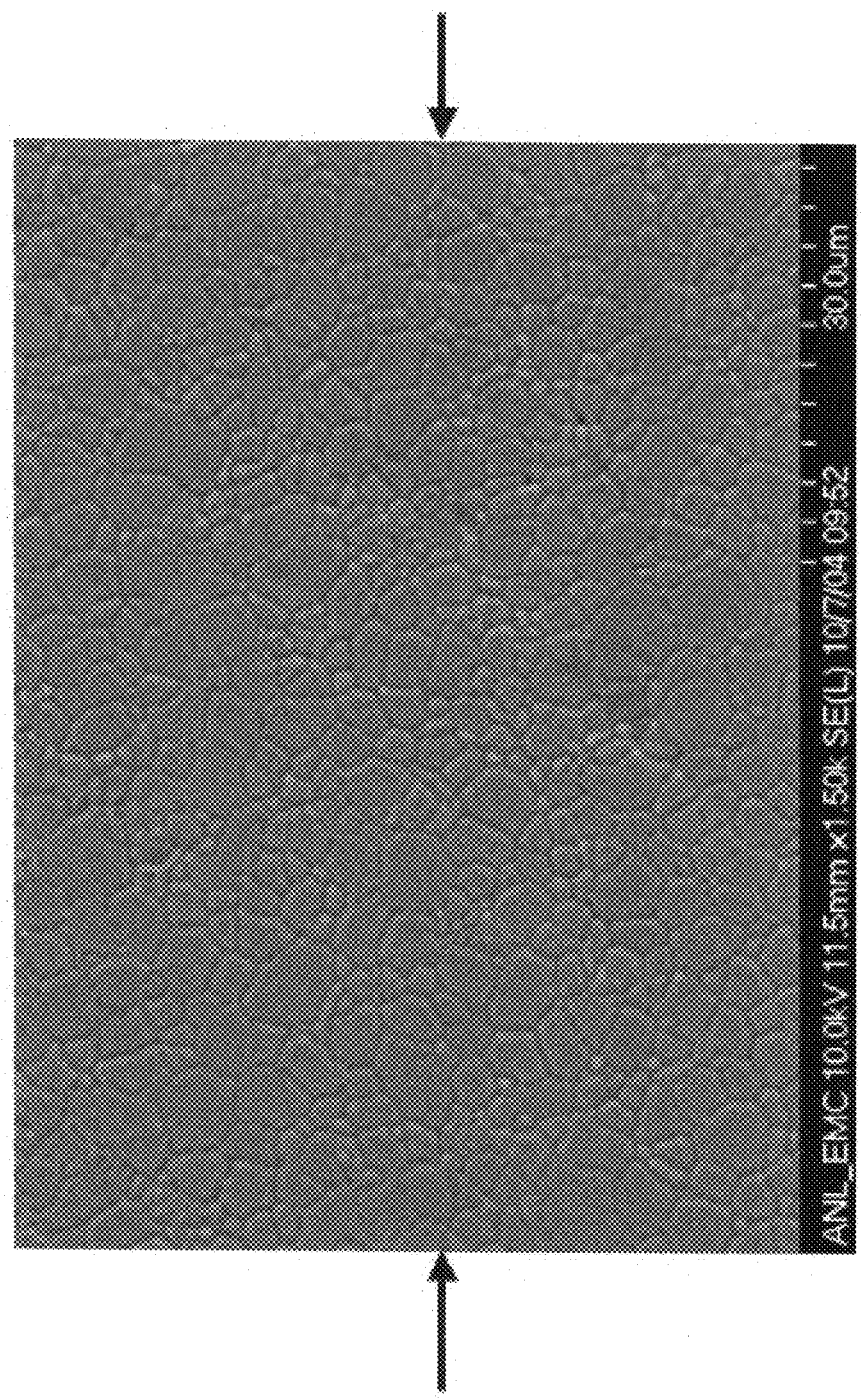
FIG. 6 is a scanning electron micrograph of a joined bioceramic material, in accordance with features of the present invention.

FIG. 6 is a scanning electron micrograph of an hydroxyapatite joint fabricated at 1275° C. at a strain rate of $10^{-5}s^{-1}$. Arrows on the figure indicate the location of the interface between the two joined pieces.

Figure 7:
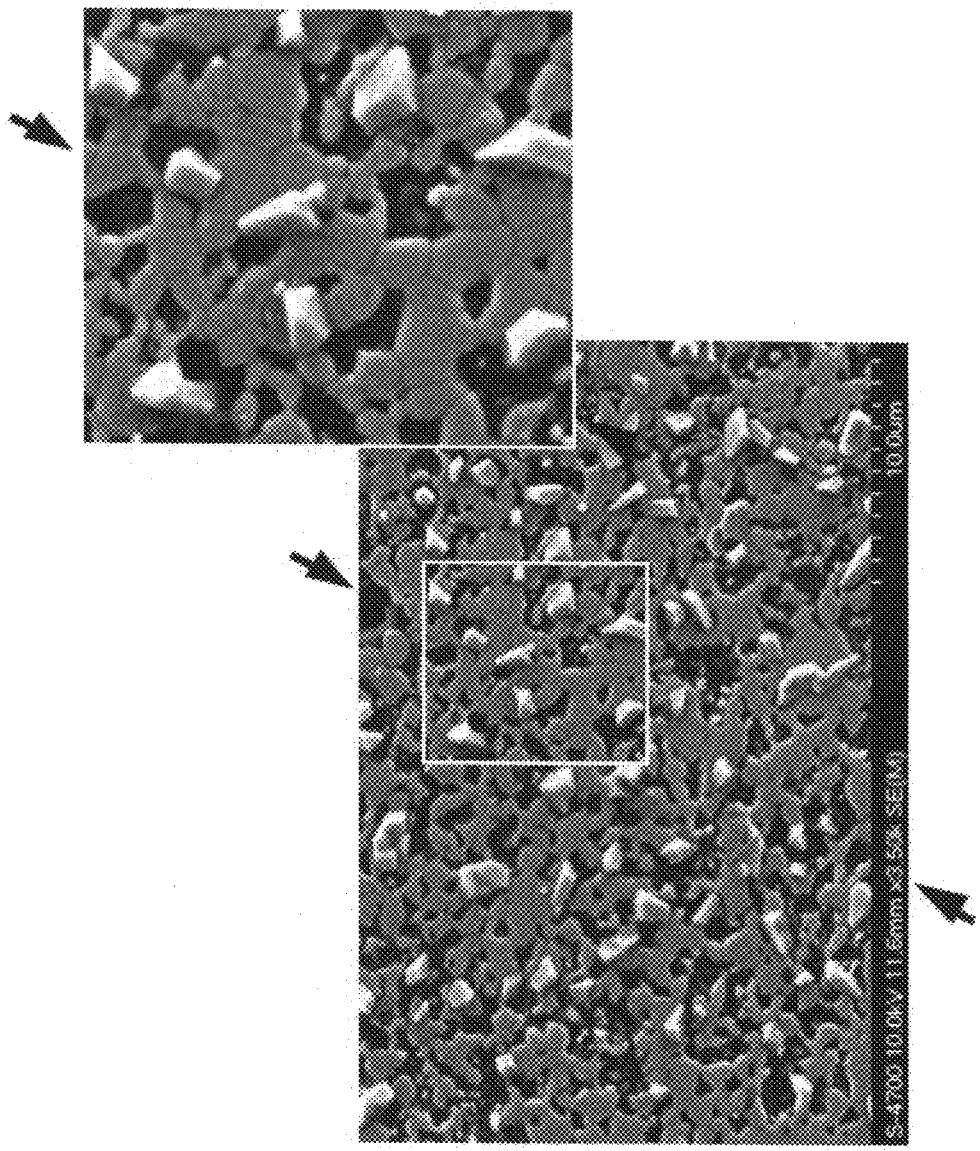
FIG. 7 is a scanning electron micrograph of a porous joined bioceramic material, in accordance with features of the present invention.

FIG. 7 is a scanning electron micrograph of an hydroxyapatite joint.

Figure 8A:
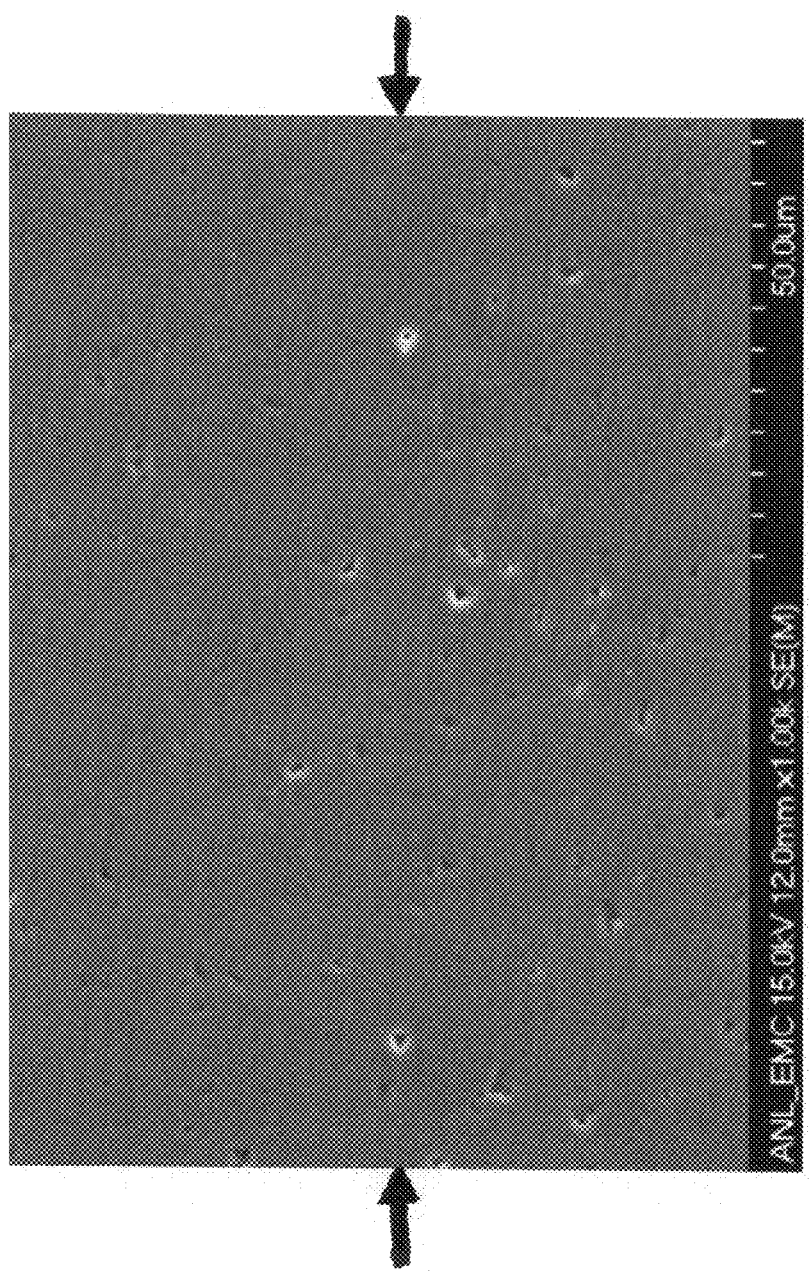
FIGS. 8A-B are a scanning electron micrograph of a joined optical material and a graph showing transparency characteristics, in accordance with features of the invention.
Figure 8B:
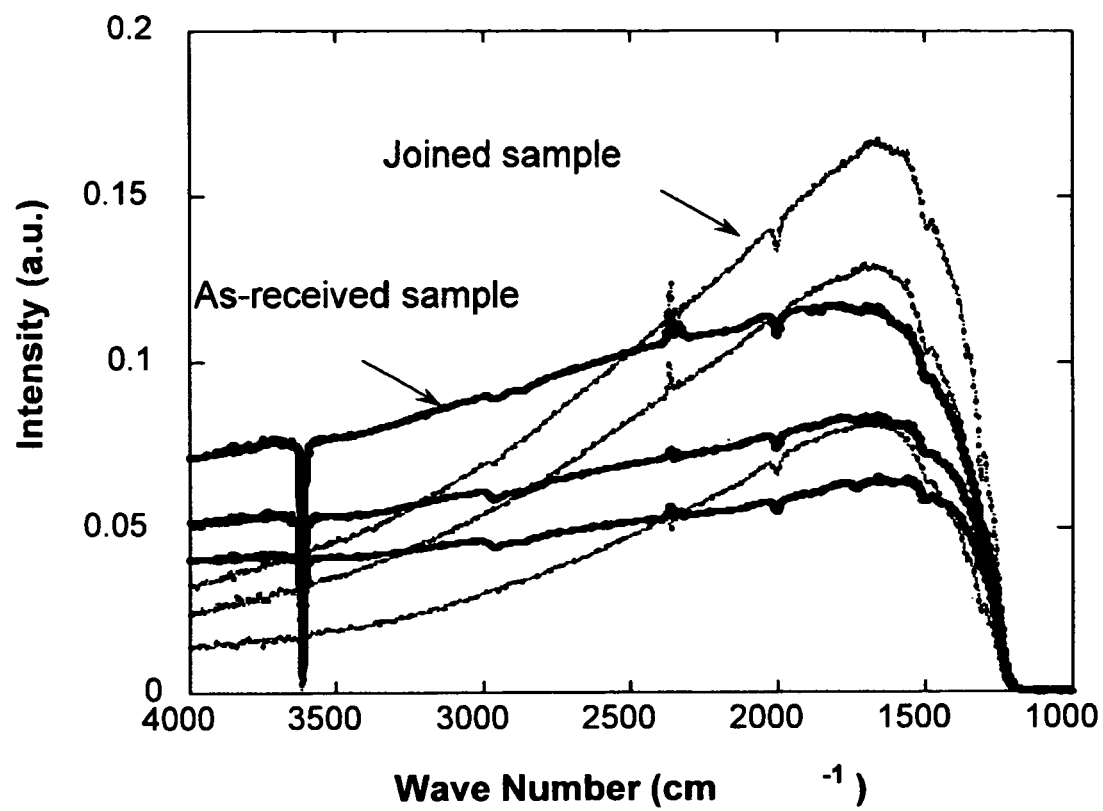

FIG. 8A-B concerns optical ceramics ($MgF_2$) and the minimal effect the invented process for ceramic joining has on the transparency of the material. FIG. 8A shows a scanning electron micrograph of the material at 35,000 X, and the arrows indicate the region of the interface.

FIG. 8B shows no degradation in optical transparency in the joined sample versus the as-received sample. In fact, an increase in transparency was noted after corrections for length difference at 2000 $cm^{-1}$. These results show that porosity of the parent subunits was maintained during the joining process, with little or no cavitation occurring.

A myriad of optical ceramic compounds are suitable for the aforementioned joining process, including but not limited to $MgF_2$, $TiO_2$, ZnS, MgO, GaN, ZnSe and GaAs. Combinations of these materials are also suitable.

The invented construct fabrication method controls residual stresses, surface stresses, interface stresses, and also establishes and maintains native porosity throughout the construct. This tailored porosity is consistent across the interface region between subunits comprising the construct, and at the interface region. As a result, a myriad of applications are envisioned for constructs fabricated by the method, including valve stems for engine applications, $NO_x$ and $CO_2$ sensors, membranes, fuel cells (fusing bipolar plate to electrolyte or electrolyte to electrode, sealants), batteries (fusing plates to electrolyte), radomes, and optical materials (without changes in optical transmission).

The following is a general discussion of some exemplary applications of the invented fabrication method. These applications and the chemical species disclosed therein should not be construed as limiting the scope of the invention. Rather, the specific moieties are provided for illustrative purposes only:

EXAMPLE 3

Join Optical Ceramics:

Applications for such materials include optical windows, wave guides, fibers, radomes, and mirrors. $MgF_2$ is perhaps the most widely used ceramic for optical applications. It transmits IR wavelengths (0.2-10 μm), but our process can be used to join other polycrystalline optical-transmitting materials based on oxides, halides, and silicates.

In one embodiment: $MgF_2$ ceramics of sample size 3×3×5 mm were mated, with no surface preparation. They were heated in argon to 800° C. and compressed at strain rates of $5×10^{-6}$/s to a total strain of less than 5%. Optical transmission properties of as-received and joined samples were measured and found to be almost identical.

EXAMPLE 4

Join Bioceramics:

An exemplary bioceramic is hydroxyapatite (HA), i.e., $Ca_{10}(PO_4)_6(OH)_2$, which is biocompatible with human tissue and exhibits long-term chemical durability. One of the more common biomedical uses of HA is in coating of non-biocompatible materials, such as titanium, used for implants such as teeth and bones. HA coatings are often applied to titanium prostheses by techniques such as plasma spray.

After implantation, because of HA's excellent osteoconduction characteristics, it bonds to human tissue by infiltration of tissue within the implant. HA is also used directly as bone replacement. Recently, various pore geometries and sizes have been incorporated into HA structures in order to promote implant-tissue bonding. However, this approach allows one to fabricate only simple geometric shapes. A major challenge is to produce complex shapes of HA that can replicate human bone structures. Joining of multiple simpler shapes allows one to produce a complex part. This fabrication process must not alter the microstructures significantly, which includes retaining pores at their original sizes and distributions. No cavitation (i.e., no formation of cavities) occurs. This is an improvement over the state-of-the-art which exhibits cavitation due to different materials deforming inhomogenously or differently.

In one embodiment of the method, the inventors have fabricated pore-free joints in air at 1275° C. at a compressive strain rate of $10^{-5}$/s. The stress on the joint during pressing was <10 MPa. Specifics for this embodiment can be found in D. Singhetal., *Appl. Ceram. Technol.* 2 (2005) 247-255, incorporated herein by reference.

EXAMPLE 5

Joining of Electronic Ceramics to Themselves or to Other Hard-to-Join Materials:

A generalized method for joining electronic ceramics is found in F. Gutierrez-Mora and J. L. Routbort, J. Am. Ceram. Soc. 85 (2002) 2370-2372, and incorporated herein by reference. The instant method provides for joining electronic ceramics with tailored porosity to dense or porous ceramics. Most importantly, the porosity along the resulting joint is the same as that of the starting electronic ceramic. This differs from other joining techniques which result in modification of the porosity near the joint.

Joint porosity is often needed for fugacity of a gas, and thus the interface of an optimally produced composite will have the porosity needed to allow access of a gas. The invented controlled-compression technology can accomplish just such retention of size and distribution of porosity.

EXAMPLE 6

Join Composite Ceramics to Monolithic Ceramics

Surprisingly and unexpectedly, the invented method facilitates the joining of ceramic monoliths to form composites. For example, for $Al_2O_3/Y_2O_3$-partially stabilized $ZrO_2$ (YSZ) composites, $Al_2O_3$ can be joined to ($Al_2O_3$/YSZ) or YSZ to ($Al_2O_3$/YSZ). The key consideration is choice of grain size, compression temperature, and compression rate. Ranges are shown above.

EXAMPLE 7

Join Ceramic to Metals or Intermetallics

Metals or metallic composites joined to ceramics or ceramic composites now include many important applications. For example, in new highly efficient fuel cells, it is required to join a bipolar plate to an electrode, while maintaining porosity of the anode (usually a $Ni/Y_2O_3$—$ZrO_2$ composite) or to join a solid electrolyte (YSZ or $CeO_2$ doped with CaO, $Y_2O_3$, or rare earths) to an anode or cathode (a perovskite). In such fuel cells, it is also required to join an interconnect (such as $LaCrO_3$) to the anode (this is example of a ceramic to ceramic as discussed in Example 3 above).

There are also several applications in membrane technology as the perovskite or pyroclore ceramics could be bonded directly to a metallic housing or manifold, thereby removing the need for a glass seal that limits the operational temperature to the softening temperature of the glass. In battery applications a solid ceramic electrolyte must be bonded to metallic electrodes. There are also many applications in bonding protective oxide coatings to a reactive metal.

Developing techniques to join ceramics to intermetallics will allow fabrication of engineering components that will provide enhanced properties at lower costs. For example, one does not have to fabricate a complete component out of ceramic; only section exposed to elevated temperatures can be made out of ceramic and rest could be an intermetallic. Overall costs for such components will also be lower.

As noted supra, the main challenge for joining an intermetallic to ceramic is the large difference in the coefficient of thermal expansion (CTE) of the two materials. Suitable constructs include an intermetallic ($Ni_3Al$) joined to ceramic ($ZrO_2$) by using an intermediate material such as NiCrAl alloy. (The nickel compound is specified inasmuch as the CTE of NiCrAl is intermediate to that of $Ni_3Al$ and $ZrO_2$.)

The protocol includes depositing a layer of (few hundred microns) of NiCrAl alloy on $Ni_3Al$. Subsequently, plastic deformation technique is used to join coated $Ni_3Al$ to $ZrO_2$ at temperatures ~1250° C. This protocol is also viable to join other intermetallics (TiAl) to $Al_2O_3$.

EXAMPLE 8

Joining Ceramics to Ceramics While Establishing Compressive Stresses at Selected Construct Loci These forms are essentially sandwiches, as discussed previously, (see FIG. 5) with a thin layer between two comparatively large pieces. Rather, here we join three pieces and, since in service, failure will initiate at a surface of the construct, we place compressive stresses at the surface. Two basic forms, with countless variations are elaborated here The invented method is applicable to any pair of polycrystalline ceramics with appropriate mismatches in the coefficient of thermal expansion.

Simple sandwich forms can be made by uniaxial pressing. The form in which one or more phases completely surround (in cross section) an inner phase can be fabricated by multi-axial or isostatic pressing.

While the invention has been described with reference to details of the illustrated embodiment, these details are not intended to limit the scope of the invention as defined in the appended claims. Other modifications of the materials presented above are also possible. For example, the inventors have joined subunits comprising $LaSrMnO_3$ (LSM) to subunits comprising yttria stabilized zirconia (YSZ). The resulting construct provides fabrication material for structures which operate in high temperature environments and/or to encapsulate sensors which monitor target moiety content (e.g., oxygen levels) of high temperature fluids, corrosive fluids, or fluids associated with harsh environments, such as flue gases.

The embodiment of the invention in which an exclusive property or privilege is claimed is defined as follows:

1. A method for the fabrication of constructs containing preselected regions of residual stress, the method comprising:
    a) selecting constituents of the construct which exhibit grain boundary sliding at temperatures below 0.7 times the melting point temperature of the lowest melting point constituent;
    b) assembling the constituents without an interlayer to form a loosely assembled construct, and wherein a first subunit with a first coefficient of thermal expansion contacts a second subunit with a second coefficient of thermal expansion, wherein the grains comprising the first and second subunits are equal to 10 microns in average size; and
    c) compressing the loosely assembled construct for a time and at a temperature to cause grain boundary sliding between constituents comprising the first and second subunits to form a rigid construct.

2. The method as recited in claim 1 wherein the step of compressing the loosely assembled construct further comprises subjecting the construct to a pressure selected from 5 MPa to 100 MPa.

3. The method as recited in claim 1 wherein the subunits exhibit native porosity, are dissimilar to each other in consistency, and the rigid construct exhibits said native porosity.

4. The method as recited in claim 1 wherein the subunits exhibit a first optical transparency, the rigid construct exhibits said optical transparency, and wherein the subunits are dissimilar in consistency.

5. The method as recited in claim 1 wherein the temperature is 70 percent of the melting point of the lowest melting point constituent among the constituents.

6. The method as recited in claim 1 wherein a single temperature and compressive force is utilized.

7. The method as recited in claim 1 wherein the coefficients of thermal expansion of the constructs to be joined are selected such that the residual stresses resulting from the differences in thermal expansion coefficients resist fracture.

8. A construct produced by the method recited in claim 7, wherein the first subunit comprises $LaSrMnO_3$ and the second subunit comprises yttria stabilized zirconia.

9. A method for fabricating optically transparent constructs, the method comprising:
    supplying subunits exhibiting predetermined transparency, wherein the subunits are dissimilar in consistency, and wherein the grains comprising the subunits are equal to 10 microns in average size; and
    pressing the subunits against each other without an interlayer to form an interface, whereby plastic deformation occurs between the units at the interface while maintaining the predetermined transparency across the interface.

10. The method as recited in claim 9 wherein the subunits comprise polycrystalline material selected from the group consisting of $MgF_2$, $TiO_2$, ZnS, MgO, GaN, ZnSe, GaAs, and combinations thereof.

11. The method as recited in claim 9 wherein the subunits comprise materials having grain sizes of up to 20 microns.

12. The method as recited in claim 9 wherein the subunits are pressed against each other at strain rates between $10^{-7}$ s$^{-1}$ and $10^{-3}$ s$^{-1}$.

13. The method as recited in claim 9 wherein the subunits are pressed against each other for a time between 3 minutes and 500 minutes.

14. The method as recited in claim 9 wherein grain-boundary sliding occurs between particles comprising the subunits.

15. The method as recited in claim 1 wherein the subunits are dissimilar in constituency.

16. The method as recited in claim 1 wherein the method produces a final construct exhibiting 10 percent or less of dimensional change when subjected to mechanical stress.

* * * * *